US011111759B2

(12) United States Patent
Mudigere et al.

(10) Patent No.: US 11,111,759 B2
(45) Date of Patent: Sep. 7, 2021

(54) BALL VALVE FOR OIL AND GAS FRACTURING OPERATION

(71) Applicant: JNJ FRACKING, LLC, Dallas, TX (US)

(72) Inventors: Shawn Mudigere, Dallas, TX (US); Devaraj Sadagopan, Dallas, TX (US)

(73) Assignee: JNJ FRACKING, LLC, Dallas, TX (US)

( * ) Notice: Subject to any disclaimer, the term of this patent is extended or adjusted under 35 U.S.C. 154(b) by 0 days.

(21) Appl. No.: 16/687,058

(22) Filed: Nov. 18, 2019

(65) Prior Publication Data

US 2020/0408067 A1    Dec. 31, 2020

Related U.S. Application Data

(60) Provisional application No. 62/867,999, filed on Jun. 28, 2019.

(51) Int. Cl.
*E21B 34/02* (2006.01)
*E21B 34/10* (2006.01)
(Continued)

(52) U.S. Cl.
CPC .............. *E21B 34/14* (2013.01); *E21B 34/02* (2013.01); *E21B 34/10* (2013.01); *E21B 34/16* (2013.01);
(Continued)

(58) Field of Classification Search
CPC .......... E21B 34/02; E21B 34/10; E21B 34/16; E21B 34/101; E21B 2200/04; E21B 33/085; F16K 5/0689; F16K 37/0008
See application file for complete search history.

(56) References Cited

U.S. PATENT DOCUMENTS 2,959,187 A * 11/1960 Boyle ..................... E21B 34/02
                                                        137/456
4,262,688 A *  4/1981 Bialkowski ........... F16K 5/0663
                                                        137/242
(Continued)

OTHER PUBLICATIONS

"Operating & Maintenance Procedure—Hydraulic Wireline Ball Valve Assembly (Bi-Directional)", Exwell Oilfield Engineering PTE Ltd., Oct. 2, 2015.

*Primary Examiner* — Cathleen R Hutchins
(74) *Attorney, Agent, or Firm* — Morgan, Lewis & Bockius LLP

(57) ABSTRACT

A ball valve assembly configured to be controlled remotely can be included in a system for fracking a well. Ball valve assemblies of the present disclosure can include a main body having a bore for transmitting fluid therethrough and a ball disposed within the main body and having a throughbore, the ball being hydraulically rotatable within the main body for rotation between an open state and a closed state of the ball. Such ball valve assemblies can include other components such as one or more wipers on and in contact with an external surface of the ball throughout rotational operations of the ball to minimize debris from interfering with the valve, and/or pressure equalizing valves to adjust fluid pressure above and below the ball of the assembly, for example. Further, the ball vale assembly can be adapted to operate more safely by including a directional lock plate.

20 Claims, 14 Drawing Sheets

(51) Int. Cl.
  *E21B 34/16* (2006.01)
  *F16K 5/06* (2006.01)
  *E21B 34/14* (2006.01)
  *E21B 47/12* (2012.01)

(52) U.S. Cl.
  CPC ............ *E21B 47/12* (2013.01); *F16K 5/0657* (2013.01); *E21B 2200/04* (2020.05)

(56) References Cited

U.S. PATENT DOCUMENTS

| | | | |
|---|---|---|---|
| 4,535,852 A * | 8/1985 | Boyadjieff | F16K 5/0652 |
| | | | 166/332.3 |
| 5,377,955 A | 1/1995 | Baker | |
| 5,771,974 A * | 6/1998 | Stewart | E21B 34/045 |
| | | | 166/336 |
| 6,698,712 B2 | 3/2004 | Milberger et al. | |
| 9,618,126 B1 * | 4/2017 | LaCroix | F16K 5/0673 |
| 9,644,443 B1 | 5/2017 | Johansen et al. | |
| 2012/0181030 A1 | 7/2012 | Kajaria et al. | |
| 2013/0200286 A1 | 8/2013 | Eagen | |
| 2014/0318807 A1 | 10/2014 | Atencio | |
| 2015/0233478 A1 * | 8/2015 | Buck | F16K 5/0689 |
| | | | 251/315.1 |
| 2017/0159390 A1 | 6/2017 | Johansen et al. | |

\* cited by examiner

Hydraulic Compact Rig-Latch Assembly

SECTION A-A

BALL VALVE FOR OIL AND GAS FRACTURING OPERATION

CROSS-REFERENCE TO RELATED APPLICATION

The present application claims the benefit of U.S. Provisional Application No. 62/867,999, filed on Jun. 28, 2019, the entire disclosure of which is hereby incorporated by reference herein.

TECHNICAL FIELD

The present disclosure relates generally to ball valves, and more particularly, but not by way of limitation, to remotely-operated, ball valves for controlling flow of abrasive fluids for oil and gas fracturing operations.

BACKGROUND

Hydraulic fracturing is a hydrocarbon stimulation technique in which rock is fractured by a pressurized liquid. The process involves high-pressure injection of fracking fluid (primarily water containing proppants) into a wellbore to create cracks in deep-rock formations through which natural gas, petroleum, and brine more freely flow. When the hydraulic pressure is removed from the well, small grains of hydraulic fracturing proppants (e.g., sand or aluminum oxide) hold the fractures open.

A wellhead is the component at the surface of the well that provides a structural and pressure-containing interface for production equipment. The primary purpose of a wellhead is to provide the suspension point and pressure seals for the casing strings that run from the bottom of the hole sections to the surface pressure control equipment.

Surface equipment typically includes many valves to isolate flow of fluid. Such valves can be exposed to high pressure and particles which cause high wear and tear on the valves. Further, conventional valves are operated manually, which exposes works to potentially dangerous environments. For example, US Patent Publication 2013/0200286 which discloses a high pressure ball vale and U.S. Pat. No. 5,377,955, which discloses a gate valve. Hence a continuing need exists for improved control of the flow of fluids during well fracturing operations.

SUMMARY OF THE DISCLOSURE

An advantage or the present disclosure includes a ball valve assembly configured to be controlled remotely, which can be included in a system for fracking a well. An additional advantage of the present disclosure includes a hydraulically rotatable ball valve assembly configured to control flow of abrasive fluids.

These and other advantages are satisfied, at least in part, by ball vale assembly configured to be controlled in an open or closed state hydraulically. The ball vale assembly can be adapted to controlling abrasive fluids by including at least one wiper disposed on a portion of the ball. The wiper can advantageously remove particles from the ball surface such as particles and residue deposits that are used or develop during operation of the ball valve assembly in frac operations. In addition, or alternatively, the ball vale assembly can be adapted to operate more effectively by including valves that can adjust fluid pressure above and below the ball of the ball valve assembly. Further, in combination with each or both of the above or alternatively, the ball vale assembly can be adapted to operate more safely by including a directional lock plate to prevent rotation of the ball from one state to another.

According to one aspect of the present disclosure, a ball vale assembly includes: a main body having a bore for transmitting fluid therethrough; a ball disposed within the main body and having a throughbore, the ball being hydraulically rotatable within the main body for rotation between an open state and a closed state of the ball; and at least one wiper disposed on a portion of the ball, wherein the at least one wiper has an edge portion being in contact with an external surface of the ball throughout rotational operations of the ball.

Another aspect of the present disclosure includes a ball valve assembly comprising: a main body having a bore for transmitting fluid therethrough; a ball disposed within the main body and having a throughbore, the ball being rotatable within the main body for rotation between an open state and a closed state; and first and second hydraulic equalizing valves connected to the main body above and below the ball, respectively, and configured to adjust fluid pressure above and below the ball so as to equalize the fluid pressure therebetween. Advantageously, the ball vale assembly can further include a third hydraulic equalizing valve arranged between the first and second hydraulic equalizing valves and connected to the main body near a central area of the ball.

According to still another aspect of the present disclosure, a system for oil and gas fracturing includes a wellhead assembly configured to control flow of one or more abrasive fluids, such as fracturing fluids; and a ball valve assembly, such as a hydraulically rotatable ball valve assembly, in fluid connection with the wellhead assembly and configured to remotely control a flow of fluid, e.g., an abrasive fluid, through the wellhead assembly. Such a wellhead assembly can include a goat head configured to receive pressurized fluid and the ball valve assembly in fluid connection with the goat head and configured to remotely control a flow of fluid through the goat head. The hydraulically rotatable ball valve assembly can comprise: a main body having a bore for transmitting fluid therethrough; a ball disposed within the main body and having a throughbore, the ball being hydraulically rotatable within the main body for rotation between an open state and a closed state of the ball; and at least one wiper disposed on a portion of the ball, wherein the at least one wiper has an edge portion being in contact with an external surface of the ball throughout rotational operations of the ball. Alternatively, or in combination with at least one wiper, the hydraulically rotatable ball valve assembly can comprise: first and second hydraulic equalizing valves connected to the main body above and below the ball, respectively, and configured to adjust fluid pressure above and below the ball so as to equalize the fluid pressure therebetween. The ball vale assembly can further include a third hydraulic equalizing valve arranged between the first and second hydraulic equalizing valves and connected to the main body near a central area of the ball.

Another aspect of the present disclosure includes a wellhead pressure control fitting, which can include a generally tubular pressure control assembly having first and second assembly ends, the second assembly end configured to mate with a wellhead; and a ball valve assembly, such as a hydraulically rotatable ball valve assembly configured to control a flow of fluid to or from the fitting.

Embodiments of the present disclosure can include one or more of the following features individually or combined. For example, in some embodiments the ball valve assembly includes: a pair of wipers disposed on upper and lower portions of the ball, respectively, each wiper having an edge portion being in contact with an external surface of the ball throughout rotational operations of the ball. The at least one wiper or pair of wipers can comprise a wear and corrosion resistant material such as a high-temperature stable engineering plastic, e.g., a Teflon, a glass filled Teflon, a polyether ether ketone (PEEK) polymer, a nylon, etc.

In other embodiment, the at least one wiper or each wiper of a pair of wipers has an opening that corresponds to the throughbore of the ball. In still further embodiment, the ball vale assembly further includes a pair of ball seats disposed on upper and lower spherical surfaces of the ball, respectively; and a pair of spring holders seated on the pair of ball seats, respectively, each spring holder having cavities respectively accommodating a plurality of springs and configured to exert force on each ball seat to keep the ball in position within the main body. In various embodiment, each wiper of a pair of wipers is in contact with a first portion of the external surface of the ball and each ball seat is in contact with a second portion of the external surface.

In some embodiment, the ball vale assembly further includes a sub body detachably coupled to an upper portion of the main body and having a second bore for transmitting the fluid therethrough. In other embodiment, a bottom portion of the sub body has a first cavity and the upper portion of the main body has a second cavity, an upper ball seat of the pair of ball seats and an upper spring holder of the pair of spring holders are disposed in the first cavity, and a lower ball seat of the pair of ball seats and a lower spring holder of the pair of spring holders are disposed in the second cavity. In various embodiment, the sub body includes a flange having bolt holes for coupling the sub body to the main body.

In still further embodiments, the ball valve assembly can further include an actuating assembly attached to one side of the main body and configured to hydraulically rotate the ball between the open and closed states; and a hydraulic actuating stem arranged between the ball and the actuating assembly, and having two opposing ends respectively connected to the ball and the actuating assembly in an axial direction of the hydraulic actuating stem. The hydraulic actuating stem can be hydraulically rotatable with respect to the axial direction by the actuating assembly so as to rotate the ball between the open and closed states. In this way, the throughbore can be aligned with the bore to allow flow of the fluid when the ball is rotated to the open state, and misaligned with the bore to obstruct the flow of the fluid when the ball is rotated to the closed state. In some embodiments, the ball vale assembly further includes a ball seat disposed on an upper spherical surface or a lower spherical surface of the ball; and a spring holder having cavities respectively accommodating a plurality of springs, the spring holder being seated on the ball seat and configured to exert force on the ball seat to keep the ball in position within the main body.

In various embodiments, the actuating assembly includes: a housing accommodating a pair of cylinders vertically extending in a penetrating direction of the bore; a pair of pistons hydraulically controlled to reciprocate in the pair of cylinders, respectively; and first and second ports respectively connected to the pair of cylinders for fluid connection with hydraulic fluid, and configured to hydraulically move the pair of pistons in the pair of cylinders, respectively, wherein the pair of pistons are movable in opposite directions. In still further embodiments, the actuating assembly further comprises a pair of indicator pins respectively attached to the pair of pistons for indicating the open and closed states of the ball. In some embodiment, the hydraulic actuating stem rotates between a first position and a second position, each piston moves in a first direction to reach one end of a respective cylinder at the first position, and moves in a second direction, opposite to the first direction, to reach another end of the respective cylinder at the second position, and the first and second positions of the hydraulic actuating stem correspond to the open and closed states of the ball, respectively. In still other embodiments, each of the pair of pistons has a slot through which a drive pin penetrates, the actuating assembly further comprises an actuator lever having one side that each drive pin is coupled to, and the pair of pistons are mechanically coupled to each other by the actuator lever, thereby being simultaneously movable in opposite directions along the actuator lever.

In certain embodiments, or alternatively, the ball vale assembly includes a directional lock plate attached to another side of the main body for indicating the open and closed states of the ball. A manual actuating stem can be arranged between the ball and the directional lock plate having a first end connected to the ball and a second end connected the directional lock plate. The directional lock plate advantageously can include a bolt or pin configured to be screwed or pushed into a corresponding hole formed on an outer surface of the main body so as to manually stop the ball from rotation during operation. In some embodiments, the directional lock plate is implemented with a lock pin that is configured to keep the directional lock plate connected the manual actuating stem.

Advantageously, the ball valve assemblies of the present disclosure can have nominal sizes ranging from approximately 2.5 inch to 9.00 inch inner diameters which are compatible with conventional lubricators on frac tress and working pressures ranging from about 5,000 psi to 15,000 psi for STD and $H_2S$ services. The materials of the ball valve assemblies can be such to withstand standard and sour service environments such as various steels including stainless steel, for example. The ball valve assemblies can include Otis, Bowen union connections, for example.

Additional advantages of the present disclosure will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 4A shows the throughbore of the ball fully aligned with the bore of the main body such that the valve is fully open and allows full flow of fluid through the valve and FIG. 4B shows the throughbore of the ball perpendicular the bore of the main body such that the valve is fully closed and prevents fluid flow through the valve. The views also show pins that indicate whether the ball is in the open or closed state of operation.

DETAILED DESCRIPTION OF THE DISCLOSURE

In general, hydraulic fracturing equipment usually includes frac tanks with fracturing fluid coupled through hoses to a slurry blender, one or more high-pressure, high volume fracturing pumps to pump the fracturing fluid to a well, pipes, and gauges for flow rates, fluid density, and treating pressure. Fracturing equipment typically operate over a range of pressures and injection rates, and can reach up to 15,000 psi (100 MPa) and 100 barrels per minute (265 L/s). Many frac pumps are typically used at any given time to maintain very high flow rates in to a well.

Figure 1:
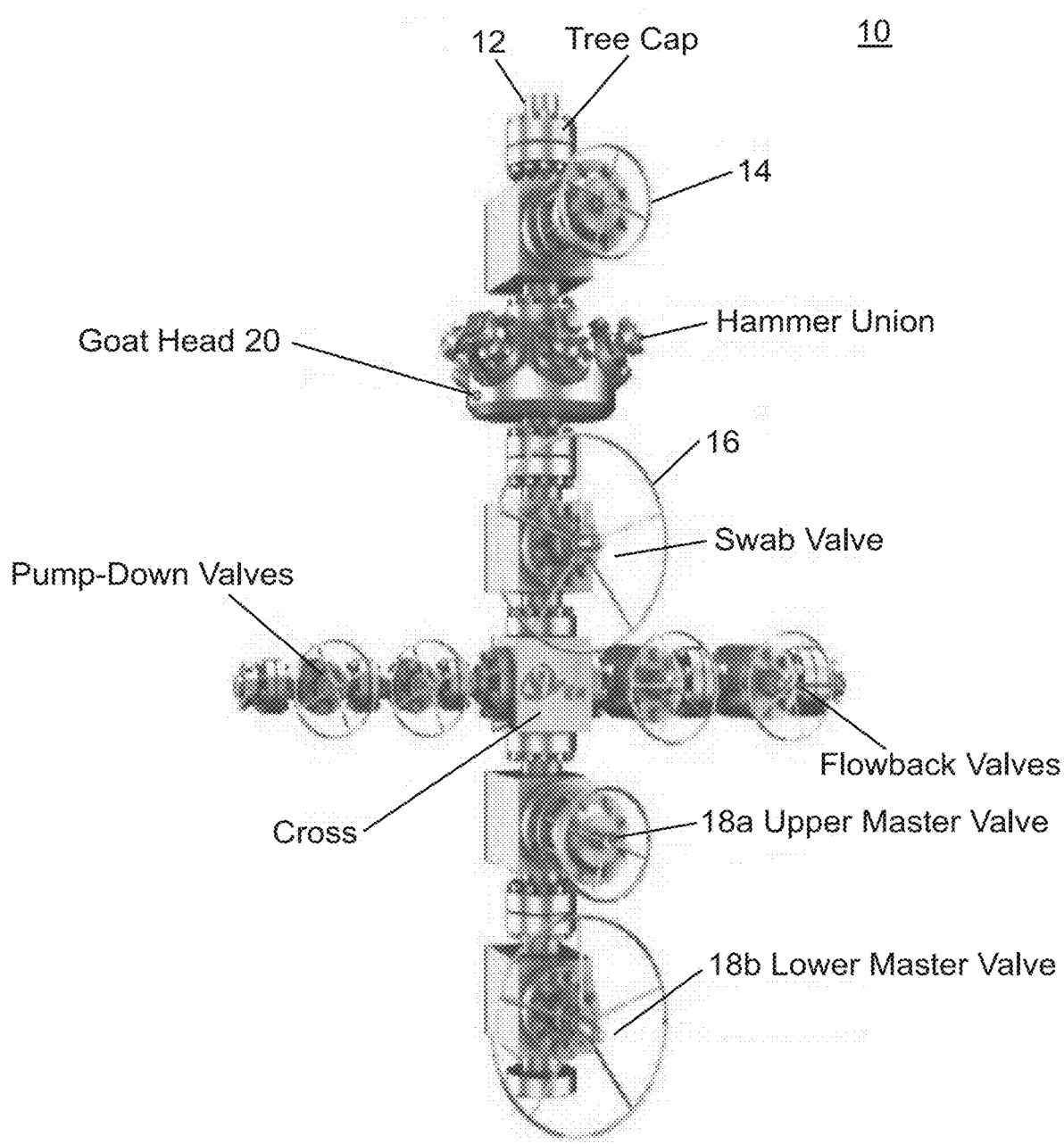
FIG. 1 illustrates a conventional frac tree with gate valves.

On the wellhead itself, a fracturing system, also referred to as a frac tree, stack or manifold, typically includes an assembly of valves, spools, pressure gauges and chokes fitted to the wellhead to control flow of gases and liquid fluids to and from the well. FIG. 1 illustrates a frac tree (10) including a cap (12) and a series of valves (14, 16, 18). One component of a fracturing system for an oilfield fracturing operation is a large block of steel for mixing fluids known as a "goat head" in which supply lines are attached to top inlets of the block which resemble "horns" from the top of a "goat head" (20).

Figure 2:
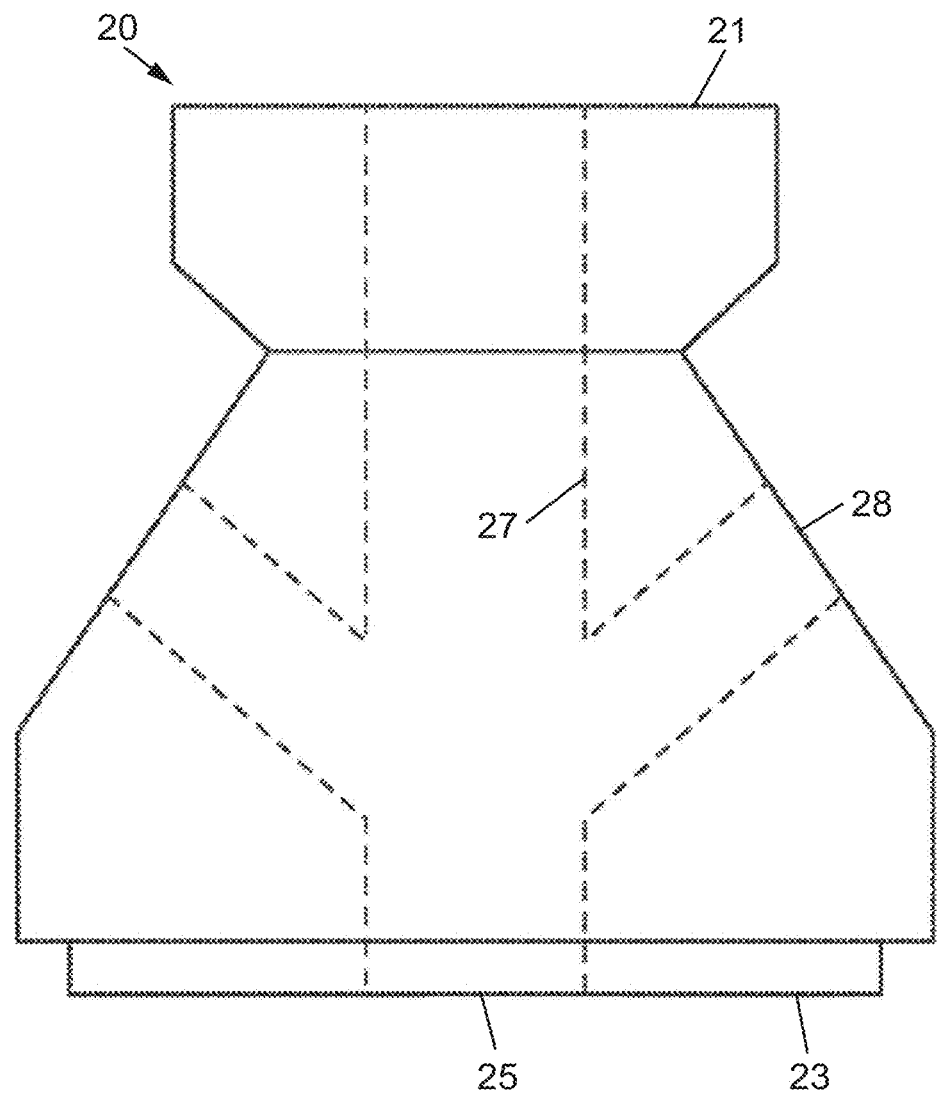
FIG. 2 is an exemplary side view schematic diagram of a goat head.

FIG. 2 is an exemplary side view schematic diagram of a goat head. A goat head is typically placed on top of a well, resulting in an elevation of about 14-16 feet (5 meters) from the ground. The goat head 20 has a top 21 and a bottom 23 and multiple fluid inlets (generally 28). The inlets 28 allow fluids to be combined from multiple supply lines into a central bore 27 for mixing. The combined flow is directed downward through an outlet 25 into the well. The flow path from the top 21 of the goat head downward into the well is an accepted practice for the industry to reduce pressure losses by reducing the bends and turns of fluid flow. The top-to-bottom flow path also reduces erosion from the sand and other proppants, typical in frac operations, on the goat head bore and other flow surfaces, and increases service life.

Often, the wellbore is subjected to multiple fluid treatment cycles in which fluid is provided and subsequently extracted. Between treatment cycles, down-hole operations may be carried out in the wellbore to install equipment or to evaluate the effectiveness of the most recent treatment cycle. Generally between treatment cycles, equipment is disconnected from the wellbore and connected to a second wellbore such that fracking operations can be carried out on the second wellbore. In certain conventional operations, wellhead connections to pressure control equipment are typically made by either a hand union or hammer union. Wellhead operators engaging or disengaging these conventional types of wellhead connections place themselves in danger of injury. In addition, these connection and disconnection operations consume a considerable amount of time and manpower.

Control and containment of injection pressures during various hydraulic fracturing operations is critical. To this end, injection pressures are conventionally controlled with gate valves and other components such as isolation tools and blow out preventers. Gate valves in frac trees and manifolds frequently flow and control high-pressure, high-volume, abrasive fluids for days and even weeks. Such abrasive fluids include fracturing fluids (fluids including primarily water containing proppants with or without other components), flowback fluids, which can contain particles within a pressurized fluid, and other fluids containing particles. Fracturing and flowback fluids are typically erosive, corrosive, and sometimes sour in nature (e.g., contain hydrogen sulfide) thus requiring the valves to withstand such fluids for extended periods of time. However, gate valves typically require manual operation which adversely affects operator safety since the operator is positioned at the wellhead and is time consuming to effect opening and closing of the gate valves.

Another common problem encountered during fracturing operations is the invasion of proppants, e.g., sand, or acid into the valve body. The proppants become compacted in the top and bottom of the valve body causing the valve to be inoperable. Similarly acids typical in fracturing operations can react with and corrode the valve body.

Ball valve assemblies according to the present disclosure can be substituted for the gate valves conventionally located on a frac tree, among other locations. Advantageously, ball valve assemblies of the present disclosure can be controlled remotely, e.g., the ball valves can be hydraulically operated to open and close the valve which allows remote operation of the valve. In addition, the ball valves of the present disclosure are preferably bi-directional, e.g., holding pressure from above and below the valve. The ball valve assemblies can be controlled, opened or closed, quickly even under high pressure, e.g., in less than about 15 second, e.g., less than about 10 seconds such as within about 7-8 seconds, or preferably within about 3-5 seconds. Further, the ball valves of the present disclosure advantageously have fewer moving parts compared to conventional gate valves and thus have reduced wear and tear and can eliminate the need for heavy-duty grease.

Ball valve assemblies according to the present disclosure can advantageously be used in a pressure control string, either above or below various components of a frac tree such as above or below a goat head in a frac tree system. The ball valve assemblies of the present disclosure can be included as an additional wellhead valve, saving wear and tear on the fixed wellhead valves or for testing the pressure control string prior to running tools in to the well.

The ball valve assemblies of the present disclosure can be configured to be fully controlled (e.g., opened or closed) hydraulically. The ball valve assemblies of the present disclosure can include a main body having a bore for transmitting fluid therethrough and a ball disposed within the main body and having a throughbore, the ball being hydraulically rotatable within the main body for rotation between an open state and a closed state of the ball. Such ball valve assemblies can include other components such as a hydraulic actuator assembly to hydraulic rotate the ball, one or more wipers on and in contact with an external surface of the ball throughout rotational operations of the ball to prevent debris for interfering with the valve, and/or pressure equalizing valves to adjust fluid pressure above and below the ball of the assembly, for example.

In certain aspects, an actuating assembly can be connected to the main body and configured to hydraulically rotate the ball between an open and closed states. In this way, an operator can remotely operate the valve to an open state or close state thereby improving safety. Preferably the ball valve assembly is configured to hold the pressure from above or below the wellhead (bi-directional). External pins can be included to indicate whether the valve is in an open state or closed state. The ball valve assembly can further include a directional lock plate, which is used to stop ball rotation while in operation. The assembly can include an injection port for supplying hydraulic fluid, e.g., glycol, grease or other suitable fluid, to operate the ball valve assembly. In addition, ball valve assemblies of the present disclosure can include a dump port to bleed well pressure.

Referring now to the drawings and more particularly to FIGS. 3A, 3B, 4A and 4B, hydraulically controlled ball valve assemblies are illustrated. In an exemplary embodiment of the present disclosure, ball valve assembly 300 includes casing 302 (or a main body) having bore 304 for transmitting fluids therethrough. Casing 302 includes, on opposite ends, connectors 306a, 306b with flanges 308a, 308b having bolt holes for attaching a pipe (not shown) such as through the use of a pipe flange (not shown). Casing 302 includes a hydraulically rotatable ball 310 seated therein by ball seats 350a, 350b disposed on an upper spherical surface and a lower spherical surface of the ball. Sealing components 351, such as O-rings, can be compressed in the ball seats 350a, 350b and arranged between the ball 310 and a respective ball seat 350a or 350b for sealing therebetween. The sealing components 351 can be made of a high-temperature stable engineering plastic such as a Teflon (e.g., polytetrafluoroethylene (PTFE)), a glass filled Teflon, a polyether ether ketone (PEEK) polymer, a nylon, etc. For this example, hydraulically rotatable ball 310 includes a wiper 340 in contact with an external surface of the ball throughout rotational operations of the ball. The wiper can advantageously remove particles form the ball surface such as sand and residue deposits that are used or develop during operation of the ball valve assembly 300. The wiper can comprise a wear and corrosion resistant material such as a high-temperature stable engineering plastic such as a Teflon, a glass filled Teflon, a polyether ether ketone (PEEK) polymer, a nylon, etc. Ball 310 has a throughbore 312 which can be aligned or misaligned with bore 304 to allow or obstruct the flow of fluid through bore 304.

Figure 3A:
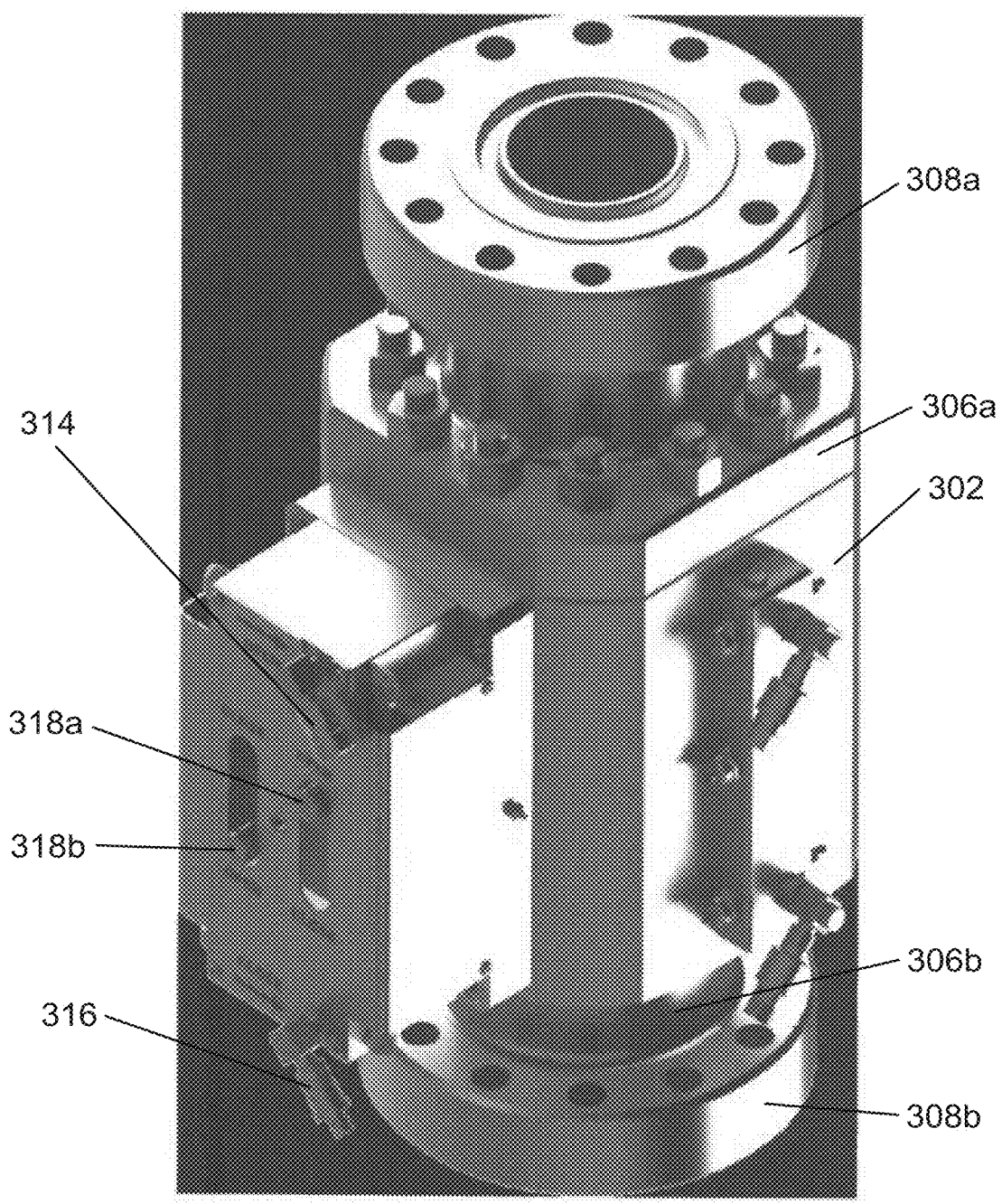
FIGS. 3A and 3B illustrate views of a ball valve assembly according to an exemplary aspect of the present disclosure.
Figure 3B:
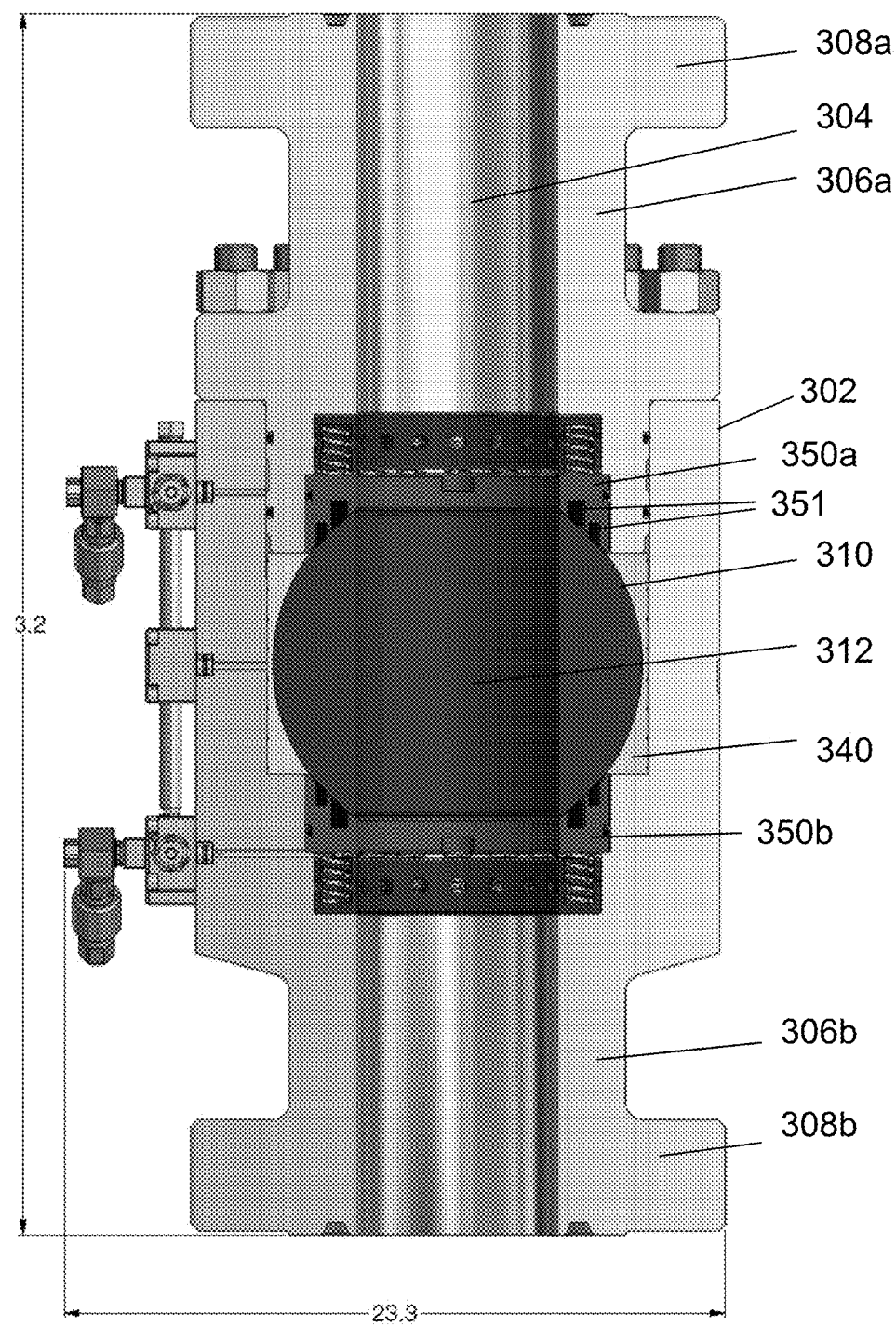

In the illustration of FIG. 3B, throughbore 312 is aligned with bore 304 of casing 302 to allow fluid to flow through the ball valve 300. The casing also includes one or more ports 314, 316 for hydraulic fluid to control movement of the ball 310 such that the ball 310 is in fluid connection with the hydraulic fluid which can rotate the ball 310 so that throughbore 312 is aligned or misaligned with bore 304 to control fluid flow through the ball valve 300. The ball valve assembly 300 illustrated in FIG. 3A includes pins 318a, 318b which indicate whether the valve 300 is fully opened or closed. Casing 302 can also include an equalization port to equalize pressure above and below the ball 310 and a dump port to bleed off well pressure.

Figure 4A:
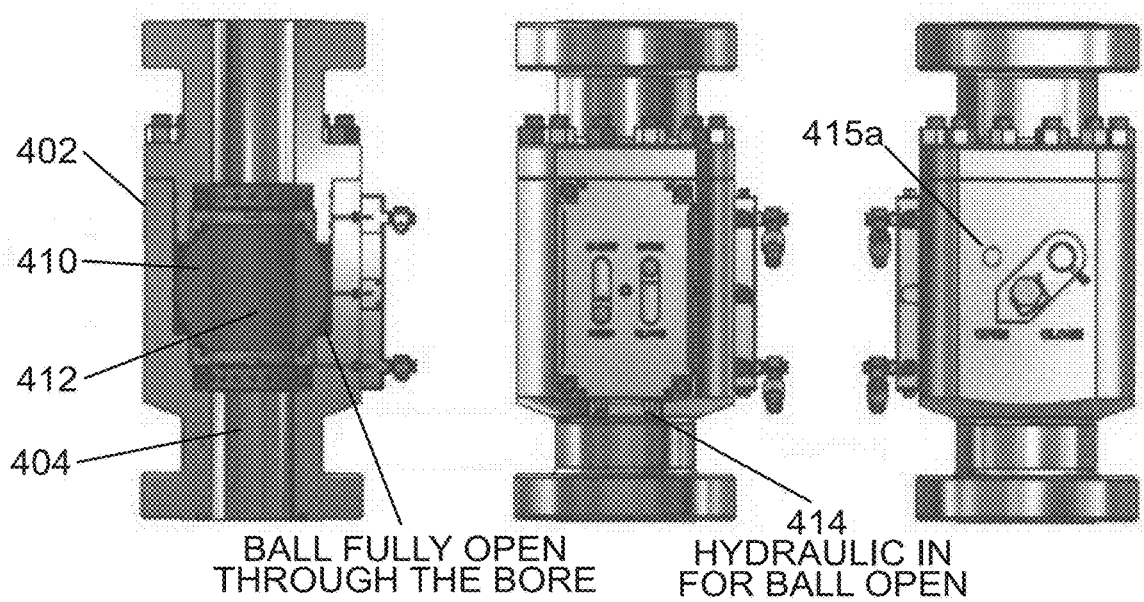
FIGS. 4A and 4B are schematic views of a ball valve assembly with a ball disposed within a main body and having a throughbore according to exemplary aspects of the present disclosure.
Figure 4B:
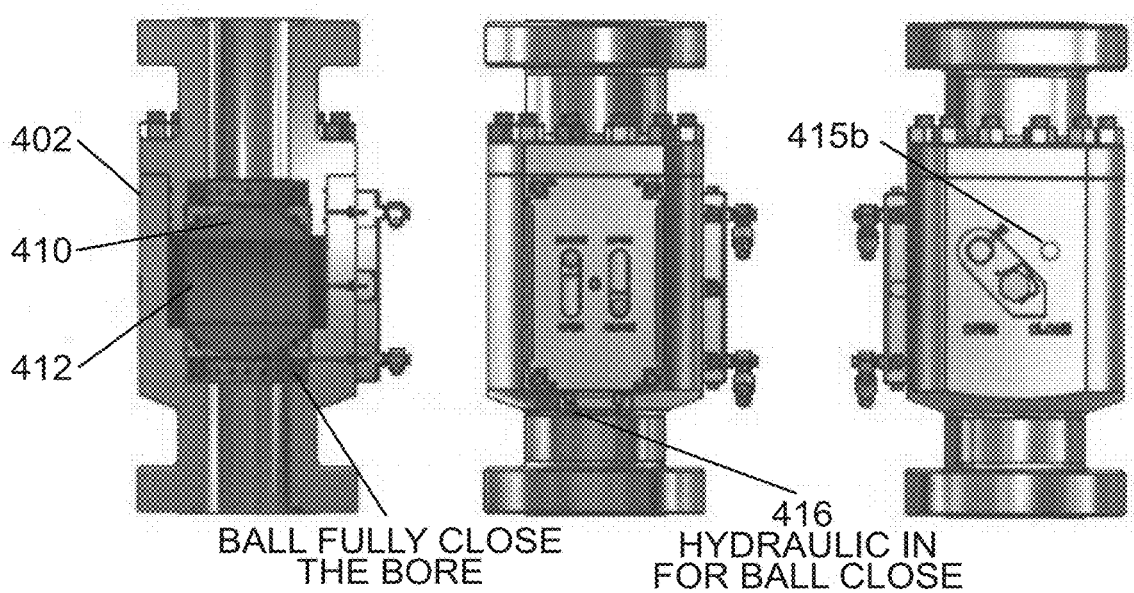

FIGS. 4A and 4B schematically show another ball valve 400 with casing 402 having ball 410 with throughbore 412 seated therein. Casing 402 has bore 404 for flow of fluids. In FIG. 4A, throughbore 412 of ball 410 is fully aligned with bore 404 such that the valve is fully open and allows the full flow of fluid through the valve. FIG. 4A also illustrates pins which indicate that the ball valve 400 is fully open. FIG. 4B is a schematic view of the ball valve 400 with ball 410 having throughbore that is perpendicular to bore 404 such that the valve is fully closed and prevents fluid flow through the valve. FIG. 4B also illustrates pins which indicate that the ball valve 400 is fully closed. The casing also includes one or more ports to connect hydraulic fluid 414, 416 such that the ball 410 is in fluid connection with the hydraulic fluid which can rotate the ball 410 so that throughbore 412 is aligned or misaligned with bore 404 to control fluid flow through the valve.

Advantageously, the hydraulic ball valve assemblies of the present disclosure can have nominal sizes ranging from approximately 2.5 inch to 9.00 inch inner diameters which are compatible with conventional lubricators on frac tress and working pressures ranging from about 5,000 psi to 15,000 psi for STD and $H_2S$ services. The materials of the ball valve assemblies can be such to withstand standard and sour service environments such as various steels including stainless steel, for example. The ball valve assemblies can include Otis, Bowen union connections, for example. Such diameters, working pressures, materials and connections can be applied to the ball valve assemblies disclosed herein including the ball valve assemblies illustrated in FIGS. 3A, 3B, 4A, 4B, and FIGS. 6-9.

In addition, the hydraulic ball valves of the present disclosure can be integrated with a latch assembly for use in capping a frac tree and to allow a facile connection and disconnection to the frac tree. Sealing connect and disconnect systems are known in the industry. One such system is known as a RigLock® which is described in U.S. Pat. No. 9,644,443 and U.S. Patent Application Publication No. 2017-0159390. Both disclosures of U.S. Pat. No. 9,644,443 and U.S. Patent Application Publication No. 2017-0159390 are hereby incorporated by reference herein.

The rig-latch of the present disclosure advantageously avoids requiring an operator near the frac tree (e.g., in the red zone) to install the latch since the ball valves of the present disclosure can be operated remotely. The rig-latch of the present disclosure further facilitates quick connections and disconnections of pressure control equipment.

Figure 5:
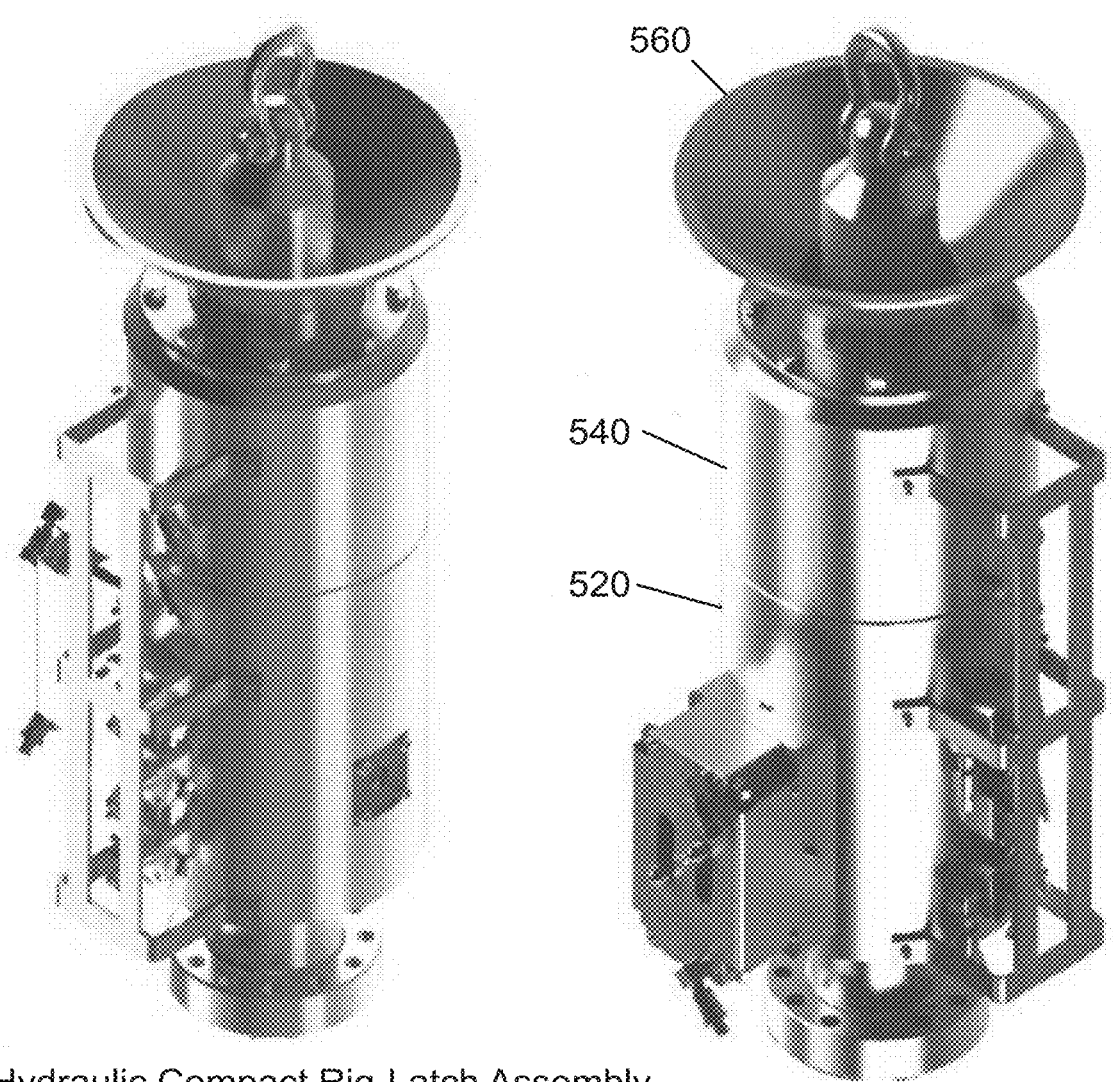
FIGS. 5A and 5B illustrate a Rig-Latch according to one exemplary aspect of the present disclosure.

FIGS. 5A and 5B illustrate a Rig-Latch of the present disclosure. As shown, the latch includes a hydraulic ball valve 520 integrated with a tulip 540 which includes a night cap 560. The hydraulic ball valve 520 can have the same components as described in the ball valve assemblies herein including the ball valve assemblies illustrated in FIGS. 3A, 3B, 4A, 4B, and FIGS. 6-9.

The hydraulic Rig-Latch is fully operated by hydraulic controlled valves, the integrated ball valve is designed to hold the pressure bi-directional. The Rig-Latch includes an auto safety lock system which can hold the piston in latch position while in operation. When well pressure is bleed off, the safety lock is release automatically free for piston movement. During unlatch or open the ball, the hydraulic equalizer is used to equalize the pressure remotely.

Figure 6A:
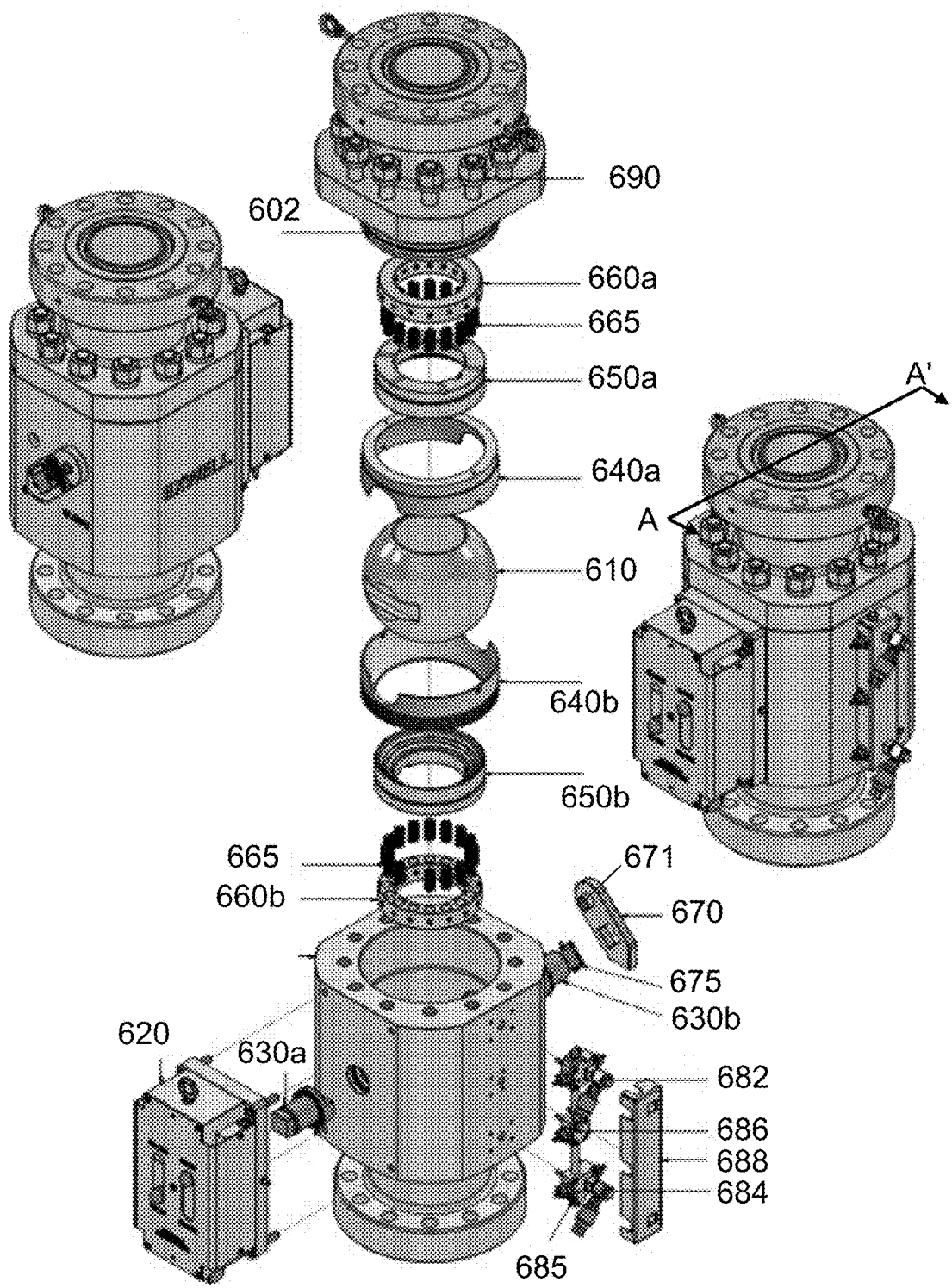
FIG. 6A is an assembly diagram of a ball valve assembly 600 according to an exemplary aspect of the present disclosure.
Figure 6B:
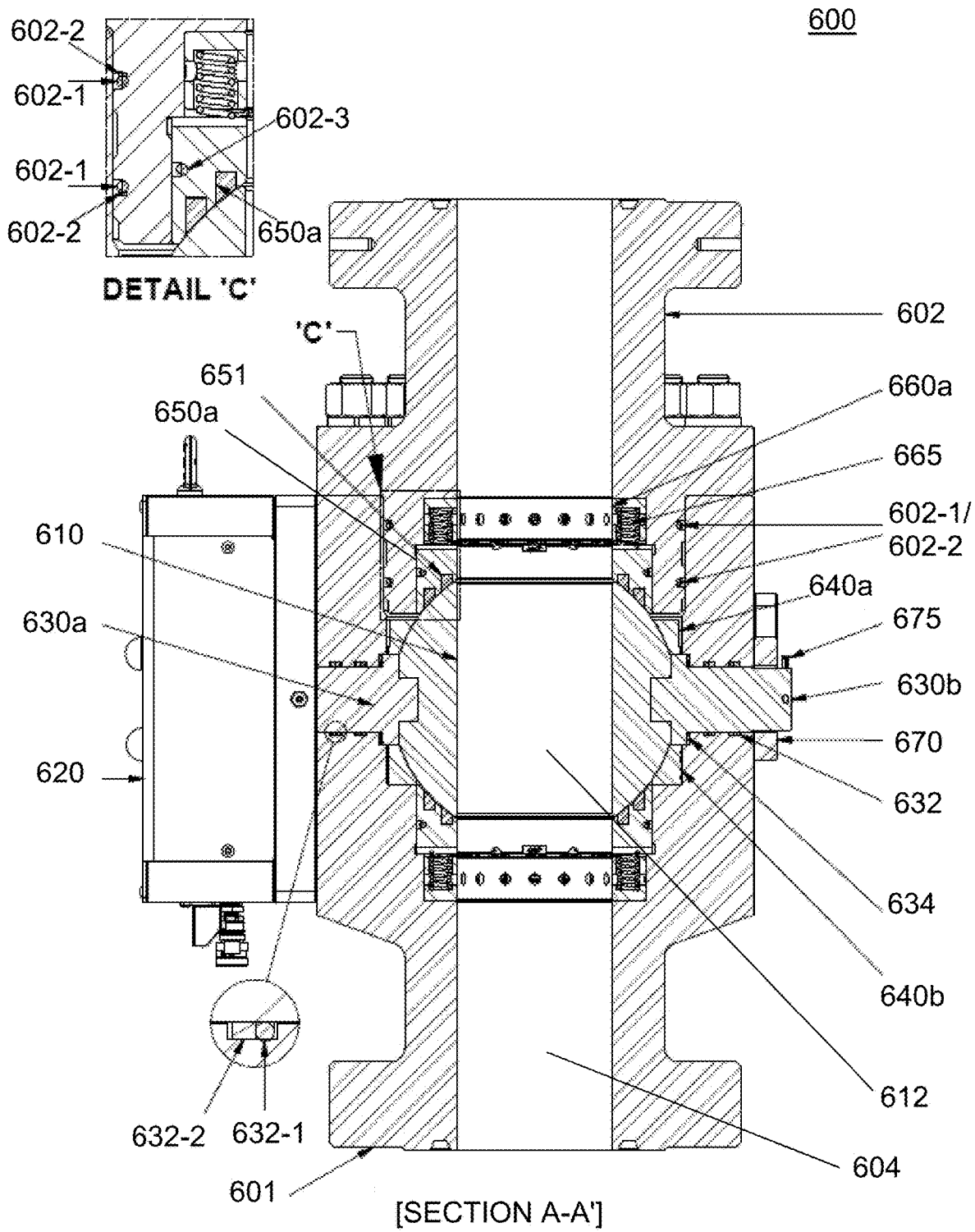
FIG. 6B is a sectional view (A-A') of the ball valve assembly 600 in FIG. 6A.

FIG. 6A is an assembly diagram of a ball valve assembly 600 according to one exemplary aspect of the present disclosure, and FIG. 6B is a sectional view (A-A') of the ball valve assembly 600 in FIG. 6A. Referring to FIGS. 6A and 6B, the ball valve assembly 600 can include a main body 601 having a bore 604 for transmitting fluid therethrough, and include a ball 610 disposed within the main body 601 and having a throughbore 612. The ball 610 is hydraulically rotatable within the main body 601 for rotation between an open state and a closed state. The ball valve assembly 600 further includes an actuating assembly 620, which as illustrated in this example, is attached to one side of the main body 601 and configured to hydraulically rotate the ball 610 between the open and closed states. The ball valve assembly 600 also includes a hydraulic actuating stem 630*a* arranged between the ball 610 and the actuating assembly 620 and having one end connected to the ball 610 and another end connected to the actuating assembly 620 in an axial direction of the hydraulic actuating stem 630*a*. In such configurations, the hydraulic actuating stem 630*a* is hydraulically rotatable by the actuating assembly 620 with respect to the axial direction of the hydraulic actuating stem 630*a* so as to rotate the ball 610 between the open and closed states. That is, the throughbore 612 is aligned with the bore 604 to allow flow of the fluid when the ball 610 is rotated to the open state, and is misaligned with the bore 604 to obstruct flow of the fluid when the ball 610 is rotated to the closed state. While FIGS. 6A and 6B show an actuating stem that can be readily separated from the ball, such a configuration is not necessary for the operation a ball valve assembly herein but can be convenient for assembling and disassembling the assembly.

The ball valve assembly 600 can further include upper and lower ball seats 650 (650*a*, 650*b*) respectively disposed on an upper spherical surface and a lower spherical surface of the ball 610, and upper and lower spring holders 660 (660*a*, 660*b*) each having cavities respectively accommodating a plurality of springs 665. The upper and lower spring holders 660*a*, 660*b* are seated on the upper and lower ball seats 650*a*, 650*b*, respectively, and are configured to exert force on the corresponding ball seat to keep the ball 610 in position within the main body 601. Further, sealing components 651, such as O-rings, can be compressed in the ball seats 650*a*, 650*b* and arranged between the ball 610 and a respective ball seat 650*a* or 650*b* for sealing therebetween.

Advantageously, ball valve assemblies of the present disclosure can include one or more wipers disposed on and in contact with an external surface of the ball throughout rotational operations of the ball. Such wipers can remove particles such as sand and residue deposits that are used or develop during operation of the ball. Preferably, the one or more wipers can comprise a wear and corrosion resistant material such as a high-temperature stable engineering plastic such as a Teflon, a glass filled Teflon, a polyether ether ketone (PEEK) polymer, a nylon, etc. For example, a ball valve assembly of the present disclosure can include a main body having a first bore for transmitting fluid therethrough; a ball disposed within the main body and having a throughbore, the ball being hydraulically rotatable within the main body for rotation between an open state and a closed state; and a pair of wipers disposed on upper and lower portions of the ball, respectively, each wiper having an edge portion being in contact with an external surface of the ball throughout rotational operations of the ball. FIG. 6 shows such an exemplary configuration.

For example, the ball valve assembly 600 can include a pair of wipers 640 (640*a*, 640*b*) disposed on upper and lower portions of the ball 610, respectively. Each wiper has an edge portion being in contact with an external surface of the ball 610 throughout rotational operations of the ball 610, to remove particles such as sand and residue deposits that are used or develop during operation of the ball valve assembly 600.

The ball valve assembly 600 can also include a sub body 602 detachably coupled to an upper portion of the main body 601 and having a bore 606 for transmitting the fluid therethrough. Such a configuration allows for ease of assembly and disassembly of components of the ball valve assembly. A bottom portion of the sub body 602 has a first cavity and the upper portion of the main body 601 has a second cavity. Then, an upper ball seat 650*a* and an upper spring holder 660*a* are disposed in the first cavity of the sub body 602, and a lower ball seat 650*b* and a lower spring holder 660*b* are disposed in the second cavity of the main body 601. The sub body 602 and the main body 601 include portions that are in contact with and support the pair of wipers 640*a*, 640*b*, respectively, when the sub body 602 and the main body 601 are coupled to each other. The sub body 602 includes a flange having bolt holes for coupling the sub body 602 to the main body 601 by using, for example, studs/stud nuts 690. The interface between the main and sub bodies 601, 602 can be sealed by, for example, O-rings 602-1 and back-up rings 602-2. The interface between the main body 601 and the lower ball seat 650*b* or the interface between the sub body 602 and the upper ball seat 650*a* can be sealed by, e.g., O-rings 602-3.

Another advantage of ball valve assemblies of the present disclosure includes a locking mechanism to prevent inadvertent opening or closing of the ball valve. According to one exemplary aspect of the present disclosure, the ball valve assembly 600 can include a directional lock plate 670 attached to another side of the main body 601, opposite to the actuating assembly 620, for indicating and locking the open and closed states of the ball 610. To illustrate this aspect, a manual actuating stem 630*b* is arranged between the ball 610 and the directional lock plate 670, and has a first end connected to the ball 610 and a second end connected the directional lock plate 670. The directional lock plate 670 includes a bolt or pin 671 disposed on an inner surface of the directional lock plate 670 and located opposite a pointed end thereof. The bolt or pin 671 of the directional lock plate 670 is screwed or pushed into one of the holes (e.g., holes 415*a*, 415*b* shown in FIGS. 4A and 4B) formed in an outer surface of the main body 601 so as to manually stop the ball 610 from rotation during operation. Once the directional lock plate 670 is placed on the main body 601 of the ball valve 600, a wire lock pin 675 can keep the directional lock plate 670 connected to the manual actuating stem 630*b*. In a normal hydraulic control of the ball valve 600, the directional lock plate 670 may be removed. Further, the ball 610 can be manually opened or closed by removing the lock plate 670 and manually rotating the ball 610 using actuating stem 630*b* with, e.g., a handle or wrench (not shown). Manually operating the ball valve can be advantageous in a case of hydraulic failure, for example. The interface between the manual actuating stem 630*b* (or hydraulic actuating stem 630*a*) and the main body 601 can be sealed by, for example, O-rings 632-1 and/or back-up rings 632-2. A thrust needle bearing 634 is arranged between the inner surface of the main body 601 and a flange portion of the manual actuating stem 630*b* (or hydraulic actuating stem 630*a*) for rotations of the manual actuating stem 630*b* (or hydraulic actuating stem 630*a*).

Figure 7:
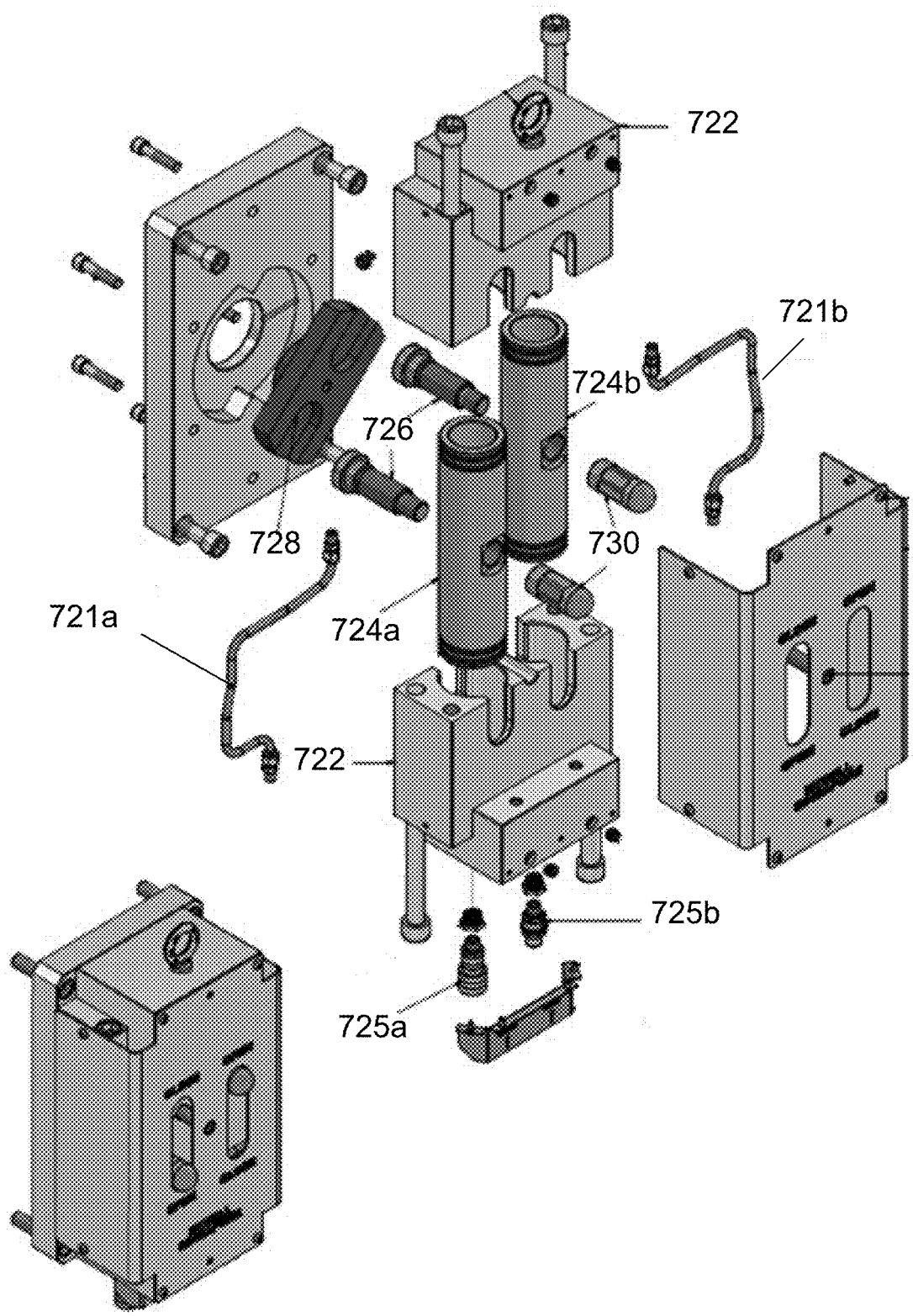
FIG. 7 illustrates an assembly diagram of an actuating assembly according to an exemplary aspect of the present disclosure.

FIG. 7 illustrates an assembly diagram of an actuating assembly 720 according to one exemplary aspect of the present disclosure. The actuating assembly 720 includes a housing 722 accommodating a pair of vertically extending cylinders, and includes a pair of pistons 724 (724*a*, 724*b*) hydraulically controlled to reciprocate in the pair of cylinders, respectively. The actuating assembly 720 further includes first and second ports 725 (725*a*, 725*b*) respectively connected to the pair of cylinders for fluid connection with hydraulic fluid. Through these first and second ports 725*a*, 725*b*, the pair of pistons 724*a*, 724*b* can be hydraulically controlled to move in the pair of cylinders, respectively. Upper and lower portions of each cylinder (i.e., spaces in the cylinder above and below a respective piston) can be fluidly communicated by a tubing 721*a* or 721*b* for the flow of the hydraulic fluid therebetween. Each piston 724 has a slot through which a drive pin 726 penetrates through the piston. The actuating assembly 720 further includes an actuator lever 728 having one side that each drive pin 726 is coupled thereto. As such, the pair of pistons 724*a*, 724*b* are mechanically coupled to each other by the actuator lever 728 and drive pins 726, thereby being simultaneously movable in opposite directions along the actuator lever 728.

Another side of the actuator lever 728, opposite to the drive pins 726, is connected to the hydraulic actuating stem 630*a*, such that the ball 610 can rotate between the open and closed states by the reciprocating movement of the pistons 724. Specifically, the hydraulic actuating stem 630*a* rotates between a first position and a second position, and each piston 724 moves in a first direction to reach one end of a respective cylinder at the first position, and moves in a second direction, opposite to the first direction, to reach another end of the respective cylinder at the second position. That is, the first and second positions of the hydraulic actuating stem 630*a* correspond to the open and closed states of the ball 610, respectively.

The actuating assembly 720 can advantageously further include a pair of indicator pins 730 respectively attached to the pair of pistons for indicating the open and closed states of the ball 610. A user can readily recognize whether the ball 610 is in an open or closed state by positions of the indicator pins 730, as shown in FIGS. 4A (open state) and 4B (closed state). Such use of indicator pins allows the user a quick and reliable way to determine the open or closed state of the valve at a distance from the valve which improves the safety of operations.

Ball valve assemblies of the present disclosure advantageously can include pressure equalizing valves to adjust fluid pressure above and below the ball of the assembly. For example, the ball valve assembly 600 can include first and second hydraulic equalizing valves connected to an inner space of the main body 601 above and below the ball 610, respectively, for adjusting (introducing or releasing) fluid pressure above and below the ball 610 so as to equalize the fluid pressure therebetween. A top manifold block assembly 682 and a bottom manifold block assembly 684 are installed at a side portion of the main body 601 as the first and second hydraulic equalizing valves, respectively. A middle manifold block assembly 686 is arranged between the top and bottom manifold block assemblies 682, 684 to be connected to the main body 601 near a central area of the ball 610. The top, middle, and bottom manifold block assemblies 682, 684, 686 are connected to each other through a connecting tube 685, and are covered by a protector cover 688. Such first and second hydraulic equalizing valves are further illustrated in FIGS. 8 and 9.

Figure 8A:
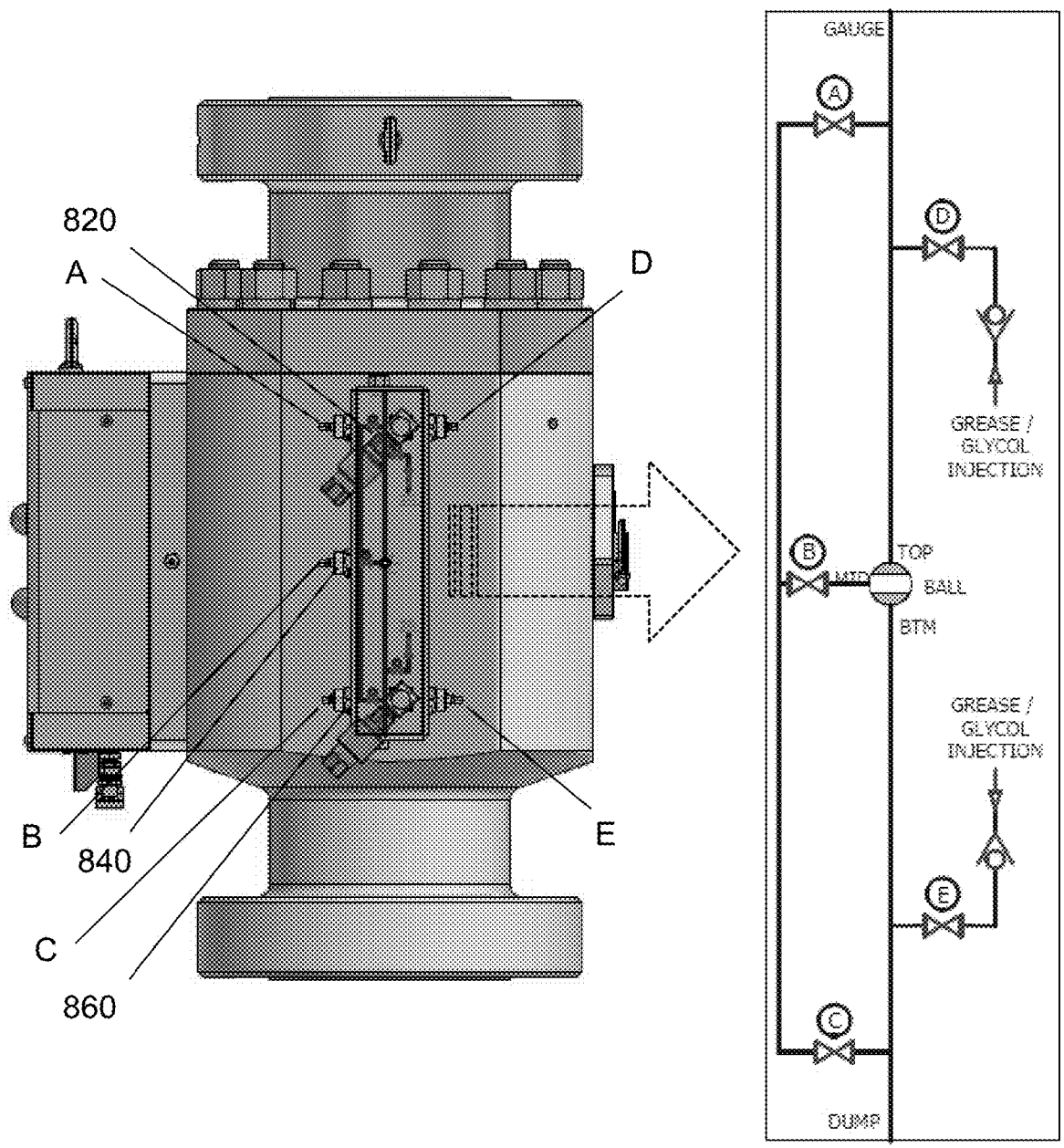
FIG. 8A illustrates a side view of a ball valve assembly and a fluid connection structure of pressure equalizing valves according to an exemplary aspect of the present disclosure.
Figure 8B:
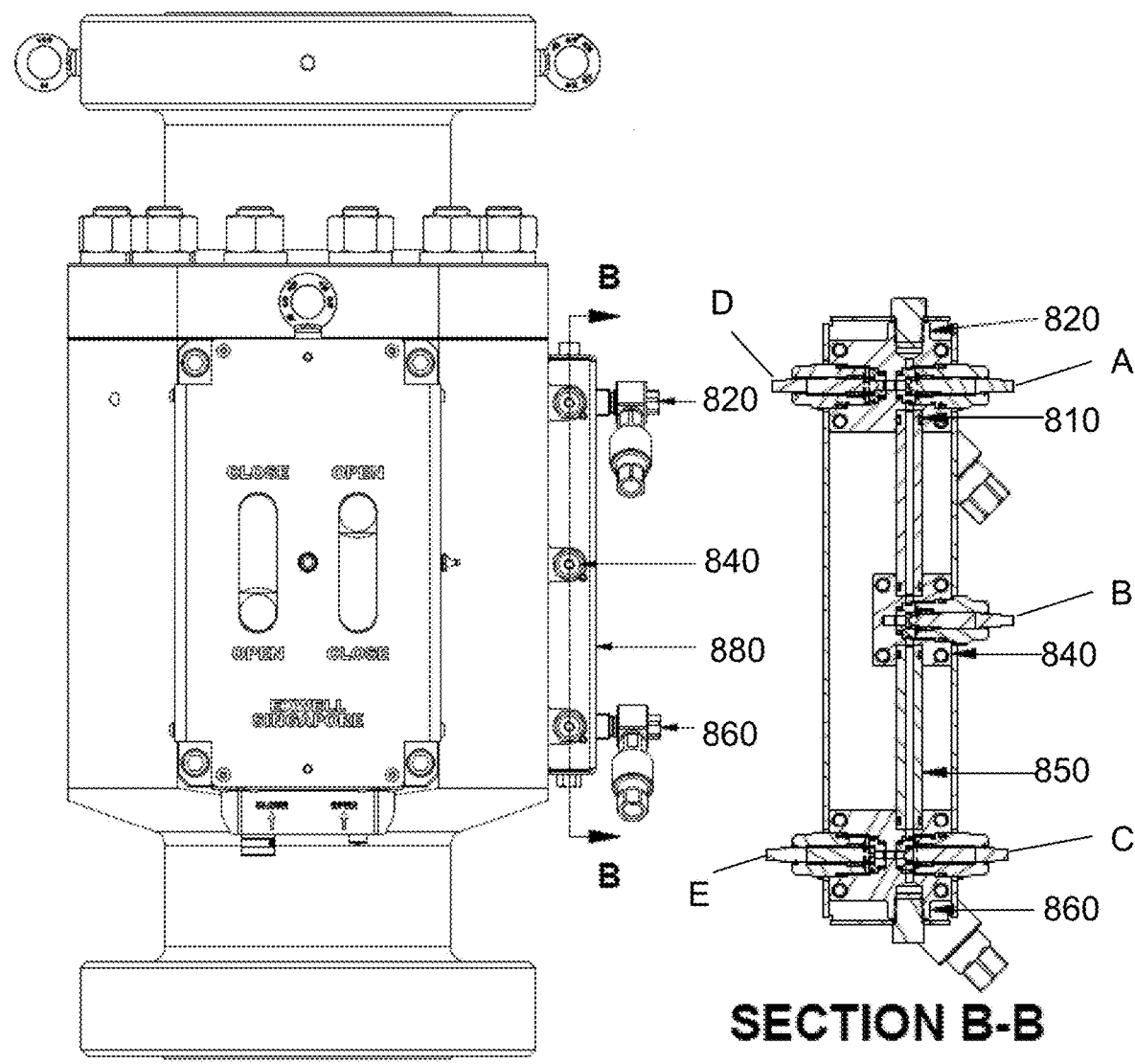
FIG. 8B illustrates a detailed sectional view of the pressure equalizing valves.
Figure 9A:
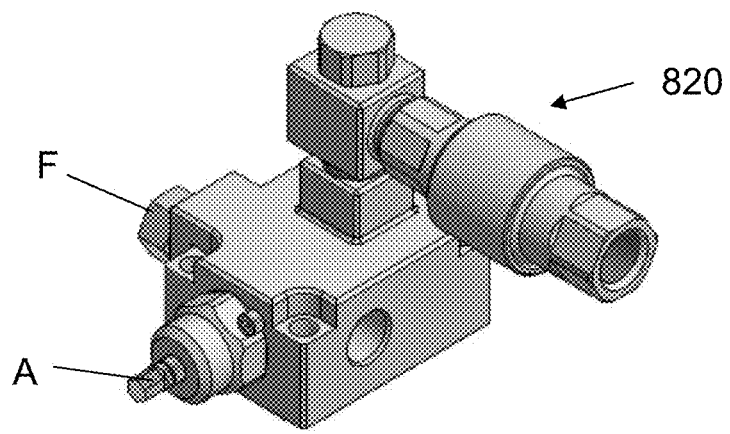
FIGS. 9A, 9B, and 9C are schematic views of top, middle, and bottom manifold block assemblies, respectively, associated with the pressure equalizing valves.
Figure 9B:
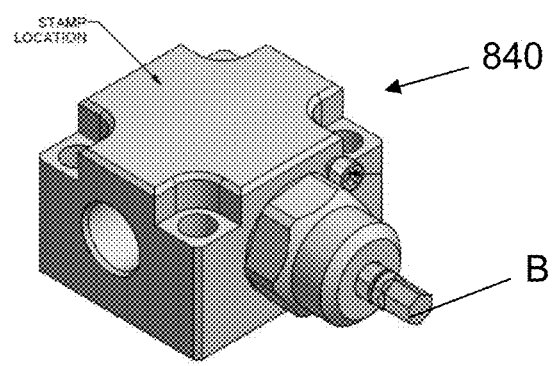
Figure 9C:
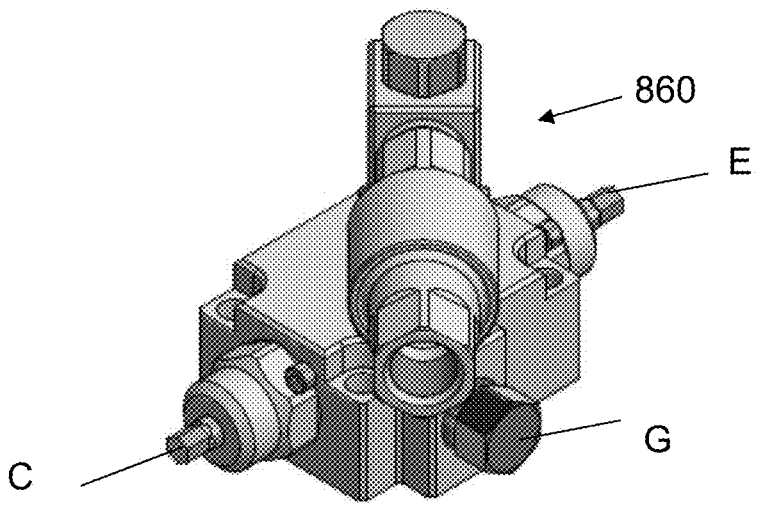

FIG. 8A illustrates a side view of a ball valve assembly and a fluid connection structure of pressure equalizing valves according to one exemplary aspect of the present disclosure, and FIG. 8B illustrates a detailed sectional view of the pressure equalizing valves. FIGS. 9A, 9B, and 9C are schematic views of top, middle, and bottom manifold block assemblies, respectively, associated with the pressure equalizing valves. Referring to FIGS. 8A and 8B, a ball valve assembly 800 can include multiple hydraulic equalization ports to equalize pressure above and below the ball of the ball valve assembly 800 and a dump/gauge port to bleed off or measure pressure. A top manifold block assembly 820 and a bottom manifold block assembly 860 are installed at a side portion of the ball valve assembly 800, as hydraulic equalizing valves, for equalizing the well pressure from below to above the ball valve, or from above to below the ball valve. A middle manifold block assembly 840 is arranged between the top and bottom manifold block assemblies 820, 860 to be connected to the ball valve assembly 800 near a central area of the ball valve. The middle manifold block assembly 840 is configured to bleed-off any pressure remained in the central area of the ball valve. The top, middle, and bottom manifold block assemblies 820, 860, 840 are connected to each other through a connecting tube 850, and are covered by a protector cover 880. O-rings 810 are provided at each connection between the manifold block assembly and the connection tube for sealing. There are grease/glycol supply ports connected to the top and bottom manifold block assemblies 820, 860 for lubrication or flushing of the components.

In the illustration of FIG. 8A, according to one aspect of the present disclosure, the operation principle of the top, middle, and bottom manifold block assemblies 820, 860, and 840 is as follows. Each of the top and bottom manifold block assemblies 820 and 860 includes a first valve A or C (e.g., a rotation valve, etc.) on one side thereof to equalize pressure above and below the ball valve that forms above or below the ball valve. Each of the top and bottom manifold block assemblies 820 and 860 further includes a second valve D or E on the other side of the assembly for opening and closing grease/glycol supply ports. On the other hand, the middle manifold block assembly 840 may include a first valve B on one side thereof to equalize or bleed-off pressure in the central area of the ball valve, such as the throughbore, but does not necessarily include a second valve for lubrication fluid injection. The top and bottom manifold block assemblies 820 and 860 can each include a port to bleed-off pressure (e.g., dump fluid or gas) and/or to include a pressure gauge to determine pressure above or below the ball of the ball valve. (See port F and G of assembly 820 and 860, respectively, in FIGS. 9A and 9C). In either or both of port F or G of manifold block assemblies 820 and 860, a pressure gauge can be attached to determine pressure above or below the ball, respectively, of the ball valve. The schematic in FIG. 8A illustrates a configuration which includes a pressure gauge for port F of manifold block assembly 820 and a bleed-off valve for port G of manifold block assembly 860 to dump (e.g., bleed-off) well pressure.

Figure 10A:
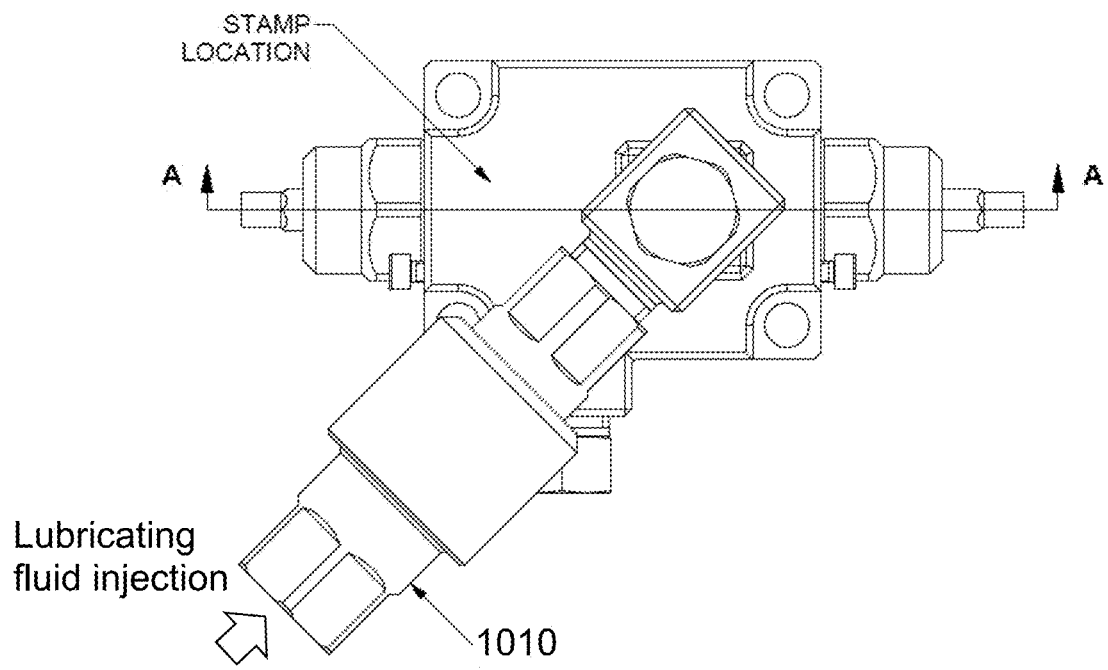
FIG. 10A illustrates a front view of a manifold block assembly according to one aspect of the present disclosure.
Figure 10B:
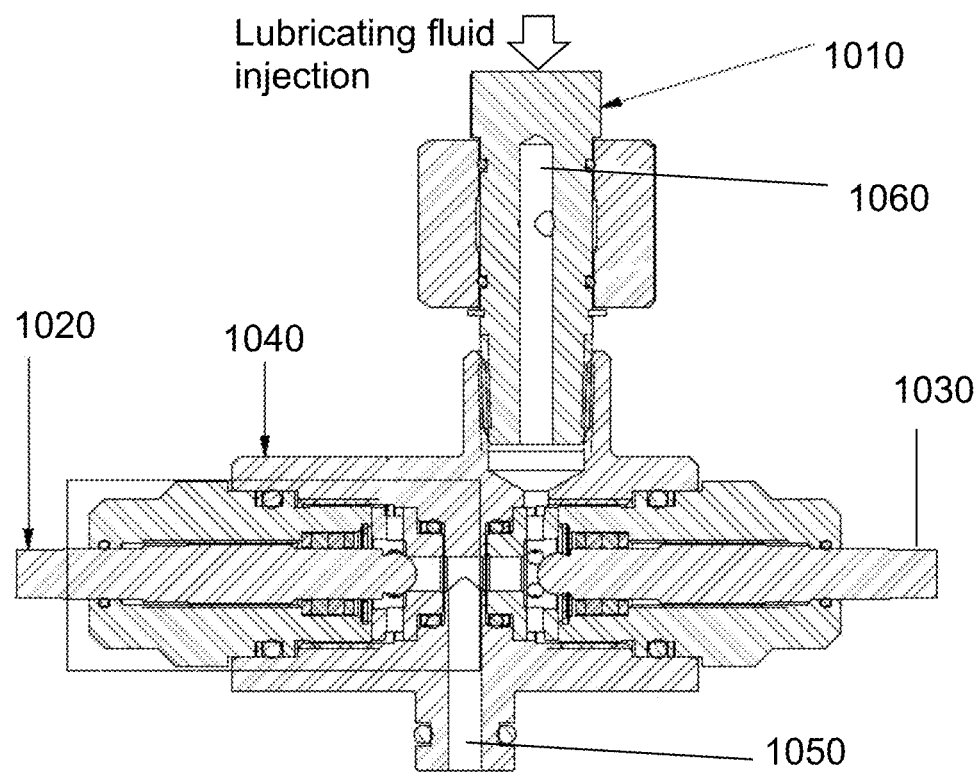
FIG. 10B is a sectional view of the section A-A of the manifold block assembly in FIG. 10A.

FIG. 10A illustrates a front view of a manifold block assembly according to one aspect of the present disclosure, and FIG. 10B is a sectional view of the section A-A of the manifold block assembly in FIG. 10A. As shown in FIGS. 10A and 10B, the manifold block assembly includes a manifold body 1040 having two opposing ends to which first and second stems 1020 and 1030 are coupled, respectively. The first and second stems 1020 and 1030 function as the first and second valves A and D (or C and E) in FIG. 8A, respectively. That is, the manifold block assembly can be connected to the ball valve assembly 800 through a port 1050 on one side of the manifold block assembly, and the first stem 1020 can be operated to equalize the pressure above or below the ball valve. On the other side of the manifold block assembly, lubricating fluid can be injected through a port 1010.

Figure 11A:
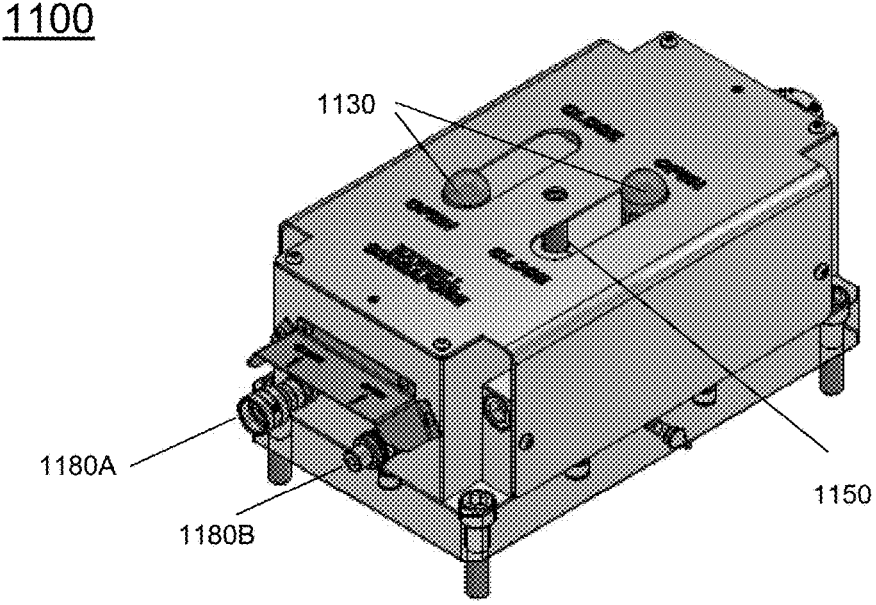
FIG. 11A illustrates an assembled view of the actuating assembly 720 shown in FIG. 7.
Figure 11B:
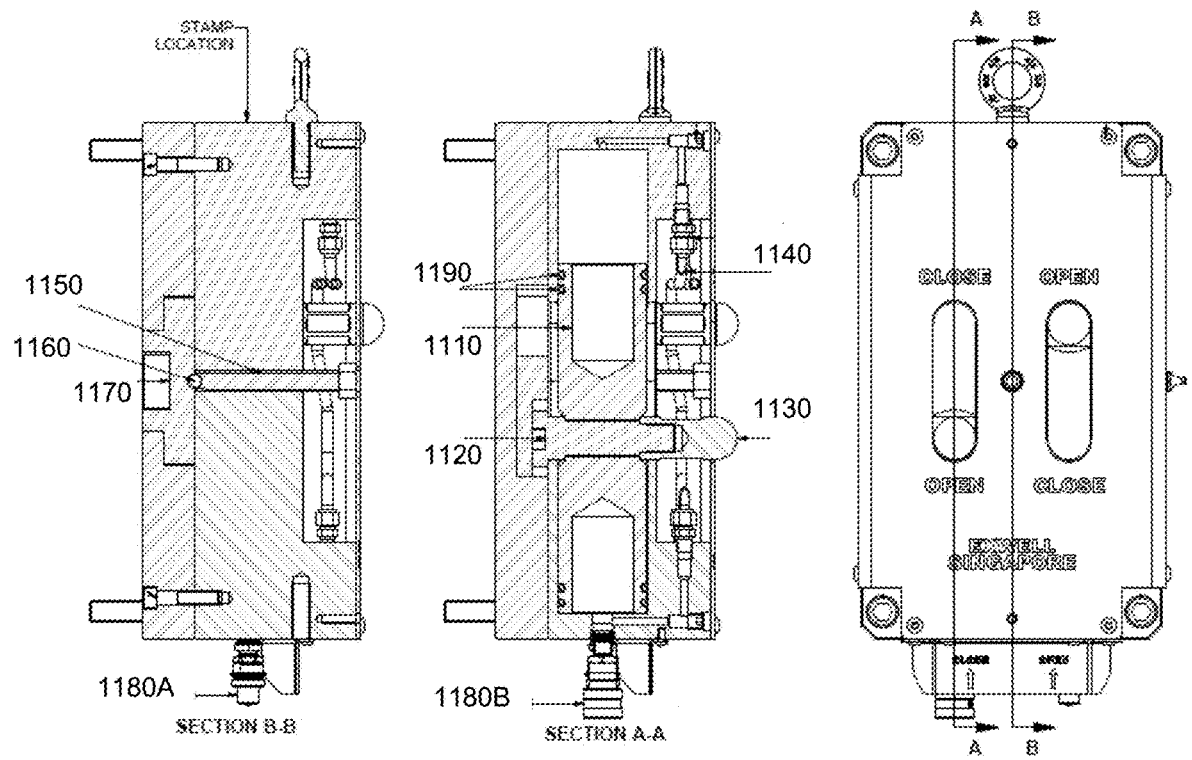
FIG. 11B illustrates sectional views of the section A-A and section B-B of an actuating assembly 1100 according to one aspect of the present disclosure.

FIG. 11A illustrates an assembled view of the actuating assembly 720 shown in FIG. 7, and FIG. 11B illustrates sectional views of the section A-A and section B-B of an actuating assembly 1100 according to one aspect of the present disclosure. Referring to FIGS. 11A and 11B, a body of the actuating assembly 1100 is coupled to an actuating lever 1170 by a pair of ball 1160/ball retainer 1150. The body of the actuating assembly 1100 includes a pair of vertically extending cylinders, each of which accommodates a piston 1110 hydraulically controlled to reciprocate therein. A pair of indicator pins 1130 respectively attached to the pair of pistons 1110, ultimately coupled to the actuating lever 1170 through a pair of drive pins 1120, can indicate the open and closed states of the ball 610. Here, spaces above and below the piston 1110 can be fluidly communicated by a tubing 1140 for the flow of a hydraulic fluid therebetween. The actuating assembly 1100 further includes first and second ports 1180A and 1180B respectively connected to the pair of cylinders for fluid connection with hydraulic fluid. The first and second ports 1180A and 1180B are fluidly connected to each other by a nipple/coupler connecting tube, which allows a hydraulic system of the actuating assembly 1100 to become a closed-loop system.

Only the preferred embodiment of the present disclosure and examples of its versatility are shown and described in the present disclosure. It is to be understood that the present disclosure is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A ball valve assembly, comprising:
   a main body having a bore for transmitting fluid therethrough;
   a ball disposed within the main body and having a throughbore, the ball being hydraulically rotatable within the main body for rotation between an open state and a closed state of the ball; and
   at least one wiper disposed on a portion of the ball, wherein the at least one wiper has an edge portion being in contact with an external surface of the ball throughout rotational operations of the ball; and
   at least one ball seat disposed on said portion of the ball; and
   at least one spring holder seated on the at least one ball seat,
   wherein the at least one spring holder includes one or more cavities accommodating one or more springs and is configured to exert force on the at least one ball seat to keep the ball in position within the main body, and
   wherein the at least one wiper and the at least one ball seat do not overlap each other in a direction perpendicular to an axial direction of the bore.

2. The ball valve assembly of claim 1, further comprising:
   an actuating assembly attached to one side of the main body and configured to hydraulically rotate the ball between the open and closed states; and
   a hydraulic actuating stem arranged between the ball and the actuating assembly, and having two opposing ends respectively connected to the ball and the actuating assembly in an axial direction of the hydraulic actuating stem;
   wherein the hydraulic actuating stem is hydraulically rotatable with respect to the axial direction by the actuating assembly so as to rotate the ball between the open and closed states;
   wherein the throughbore is aligned with the bore to allow flow of the fluid when the ball is rotated to the open state, and is misaligned with the bore to obstruct the flow of the fluid when the ball is rotated to the closed state; and
   wherein the actuating assembly comprises a housing accommodating a pair of cylinders vertically extending in a penetrating direction of the bore; a pair of pistons hydraulically controlled to reciprocate in the pair of cylinders, respectively; and first and second ports respectively connected to the pair of cylinders for fluid connection with hydraulic fluid, and configured to hydraulically move the pair of pistons in the pair of cylinders, respectively, wherein the pair of pistons are movable in opposite directions.

3. The ball valve assembly of claim 2, wherein the actuating assembly further comprises
   a pair of indicator pins respectively attached to the pair of pistons for indicating the open and closed states of the ball.

4. The ball valve assembly of claim 2, wherein:
   the hydraulic actuating stem rotates between a first position and a second position,
   each piston moves in a first direction to reach one end of a respective cylinder at the first position, and moves in a second direction, opposite to the first direction, to reach another end of the respective cylinder at the second position, and
   the first and second positions of the hydraulic actuating stem correspond to the open and closed states of the ball, respectively.

5. The ball valve assembly of claim 4, wherein:
   each of the pair of pistons has a slot through which a drive pin penetrates,
   the actuating assembly further comprises an actuator lever having one side that each drive pin is coupled to, and
   the pair of pistons are mechanically coupled to each other by the actuator lever, thereby being simultaneously movable in opposite directions along the actuator lever.

6. The ball valve assembly of claim 1, further comprising:
   a directional lock plate attached to another side of the main body for indicating the open and closed states of the ball; and
   a manual actuating stem arranged between the ball and the directional lock plate, and having a first end connected to the ball and a second end connected the directional lock plate,
   wherein the directional lock plate includes a bolt or pin configured to be screwed or pushed into a corresponding hole formed on an outer surface of the main body so as to manually stop the ball from rotation during operation.

7. The ball valve assembly of claim 6, wherein the directional lock plate is implemented with a lock pin that is configured to keep the directional lock plate connected to the manual actuating stem.

8. The ball valve assembly of claim 1, wherein the at least one wiper comprises a high-temperature stable engineering plastic.

9. The ball valve assembly of claim 1, wherein the at least one wiper comprises
a pair of wipers disposed on upper and lower portions of the ball, respectively, each wiper having an edge portion being in contact with an external surface of the ball throughout rotational operations of the ball.

10. The ball valve assembly of claim 9, wherein each wiper has an opening that corresponds to the throughbore of the ball.

11. The ball valve assembly of claim 9, wherein the at least one ball seat comprises:
a pair of ball seats disposed on upper and lower spherical surfaces of the ball, respectively, and
wherein the at least one spring holder comprises a pair of spring holders
seated on the pair of ball seats, respectively, each spring holder having cavities respectively accommodating a plurality of springs and configured to exert force on each ball seat to keep the ball in position within the main body.

12. The ball valve assembly of claim 11, wherein each wiper is in contact with a first portion of the external surface of the ball and each ball seat is in contact with a second portion of the external surface.

13. The ball valve assembly of claim 12, further comprising
a sub body detachably coupled to an upper portion of the main body and having a second bore for transmitting the fluid therethrough,
wherein a bottom portion of the sub body has a first cavity and the upper portion of the main body has a second cavity,
an upper ball seat of the pair of ball seats and an upper spring holder of the pair of spring holders are disposed in the first cavity, and
a lower ball seat of the pair of ball seats and a lower spring holder of the pair of spring holders are disposed in the second cavity.

14. The ball valve assembly of claim 1, wherein a portion of the at least one wiper has a shape of a circular plate that has an opening, and an inner circumferential edge of the circular plate is said edge portion being in contact with the external surface of the ball.

15. A ball valve assembly, comprising:
a main body having a bore for transmitting fluid therethrough;
a ball disposed within the main body and having a throughbore, the ball being rotatable within the main body for rotation between an open state and a closed state;
first and second hydraulic equalizing valves connected to the main body above and below the ball, respectively, and configured to adjust fluid pressure above and below the ball so as to equalize the fluid pressure therebetween;
at least one wiper disposed on a portion of the ball, wherein the at least one wiper has an edge portion being in contact with an external surface of the ball throughout rotational operations of the ball; and
at least one ball seat disposed on said portion of the ball; and
at least one spring holder seated on the at least one ball seat,
wherein the at least one spring holder includes one or more cavities accommodating one or more springs and is configured to exert force on the at least one ball seat to keep the ball in position within the main body, and
wherein the at least one wiper and the at least one ball seat do not overlap each other in a direction perpendicular to an axial direction of the bore.

16. The ball valve assembly of claim 15, further comprising
a third hydraulic equalizing valve arranged between the first and second hydraulic equalizing valves and connected to the main body near a central area of the ball.

17. The ball valve assembly of claim 15, wherein a portion of the at least one wiper has a shape of a circular plate that has an opening, and an inner circumferential edge of the circular plate is said edge portion being in contact with the external surface of the ball.

18. A system for oil and gas fracturing, comprising:
a wellhead assembly configured to control flow of an abrasive fluid; and
a hydraulically rotatable ball valve assembly in fluid connection with the wellhead assembly and configured to remotely control a flow of fluid through the wellhead assembly,
wherein the hydraulically rotatable ball valve assembly comprises:
a main body having a bore for transmitting fluid therethrough;
a ball disposed within the main body and having a throughbore, the ball being hydraulically rotatable within the main body for rotation between an open state and a closed state of the ball;
at least one wiper disposed on a portion of the ball, wherein the at least one wiper has an edge portion being in contact with an external surface of the ball throughout rotational operations of the ball; and
at least one ball seat disposed on said portion of the ball; and
at least one spring holder seated on the at least one ball seat,
wherein the at least one spring holder includes one or more cavities accommodating one or more springs and is configured to exert force on the at least one ball seat to keep the ball in position within the main body, and
wherein the at least one wiper and the at least one ball seat do not overlap each other in a direction perpendicular to an axial direction of the bore.

19. The system of claim 18, wherein the at least one wiper comprises:
a pair of wipers disposed on upper and lower portions of the ball, respectively, each wiper having an edge portion being in contact with an external surface of the ball throughout rotational operations of the ball.

20. The system of claim 18, wherein the hydraulically rotatable ball valve assembly comprises:
first and second hydraulic equalizing valves connected to the main body above and below the ball, respectively, and configured to adjust fluid pressure above and below the ball so as to equalize the fluid pressure therebetween.

* * * * *